United States Patent
Hölzel et al.

(10) Patent No.: US 9,776,487 B2
(45) Date of Patent: Oct. 3, 2017

(54) VEHICLE ROOF WHICH CAN BE OPENED AND WHICH COMPRISES A MOVABLE COVER

(71) Applicant: Webasto SE, Stockdorf (DE)

(72) Inventors: Dominik Hölzel, Olching (DE); Johann Minatti, München (DE); Christian Lange, Unterschleißheim (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/912,463

(22) PCT Filed: Aug. 19, 2014

(86) PCT No.: PCT/EP2014/067680
§ 371 (c)(1),
(2) Date: Feb. 17, 2016

(87) PCT Pub. No.: WO2015/024944
PCT Pub. Date: Feb. 26, 2015

(65) Prior Publication Data
US 2016/0207381 A1     Jul. 21, 2016

(30) Foreign Application Priority Data

Aug. 19, 2013 (DE) ........................ 10 2013 013 587

(51) Int. Cl.
*B60J 7/047* (2006.01)
*B60J 7/057* (2006.01)
*B60J 7/043* (2006.01)

(52) U.S. Cl.
CPC ............ *B60J 7/0573* (2013.01); *B60J 7/043* (2013.01); *B60J 7/0435* (2013.01)

(58) Field of Classification Search
CPC ...................................................... B60J 7/0435
(Continued)

(56) References Cited

U.S. PATENT DOCUMENTS 4,688,848 A * 8/1987 Niwa ..................... B60J 7/0435
                                                               296/216.03
4,978,165 A     12/1990 Schreiter et al.
(Continued)

FOREIGN PATENT DOCUMENTS

| DE | 10 2008 046331 A1 | 3/2010 |
|---|---|---|
| DE | 10 2009 052451 A1 | 5/2011 |

(Continued)

OTHER PUBLICATIONS

International Search Report for PCT/EP2014/067680 mailed Nov. 4, 2014; English Translation submitted herewith (7 pages).

(Continued)

*Primary Examiner* — Dennis H Pedder
(74) *Attorney, Agent, or Firm* — Fitch, Even, Tabin & Flannery, LLP

(57) ABSTRACT

A vehicle roof which can be opened, comprising a cover that can be moved between a closed position and an open position in which the cover is raised at least at the rear edge of the cover and is at least partly moved over an adjoining roof portion. The cover is supported by means of a front bearing device, which can be moved by a drive device, such that the cover can be moved along a front guide rail and by means of a rear bearing device such that the cover can be raised over the adjoining roof portion and moved along a rear guide rail.

11 Claims, 4 Drawing Sheets

(58) Field of Classification Search
USPC .............................. 296/224, 216.02–216.05
See application file for complete search history.

(56) References Cited

U.S. PATENT DOCUMENTS

| | | | | |
|---|---|---|---|---|
| 5,058,947 A * | 10/1991 | Huyer | ................... | B60J 7/0435 |
| | | | | 296/216.03 |
| 7,578,550 B2 * | 8/2009 | Sawada | ..................... | B60J 7/04 |
| | | | | 296/216.02 |
| 7,784,859 B2 * | 8/2010 | Grimm | ................. | B60J 7/0435 |
| | | | | 296/216.03 |
| 8,870,276 B2 * | 10/2014 | Geurts | .................... | B60J 7/185 |
| | | | | 296/216.03 |
| 2009/0160223 A1 * | 6/2009 | Grimm | ................. | B60J 7/0435 |
| | | | | 296/216.04 |

FOREIGN PATENT DOCUMENTS

| | | |
|---|---|---|
| EP | 0 381 066 A2 | 8/1990 |
| GB | 2 172 932 A | 10/1986 |

OTHER PUBLICATIONS

International Preliminary Report on Patentability for PCT/EP2014/067680; English Translation submitted herewith (5 pages).

\* cited by examiner

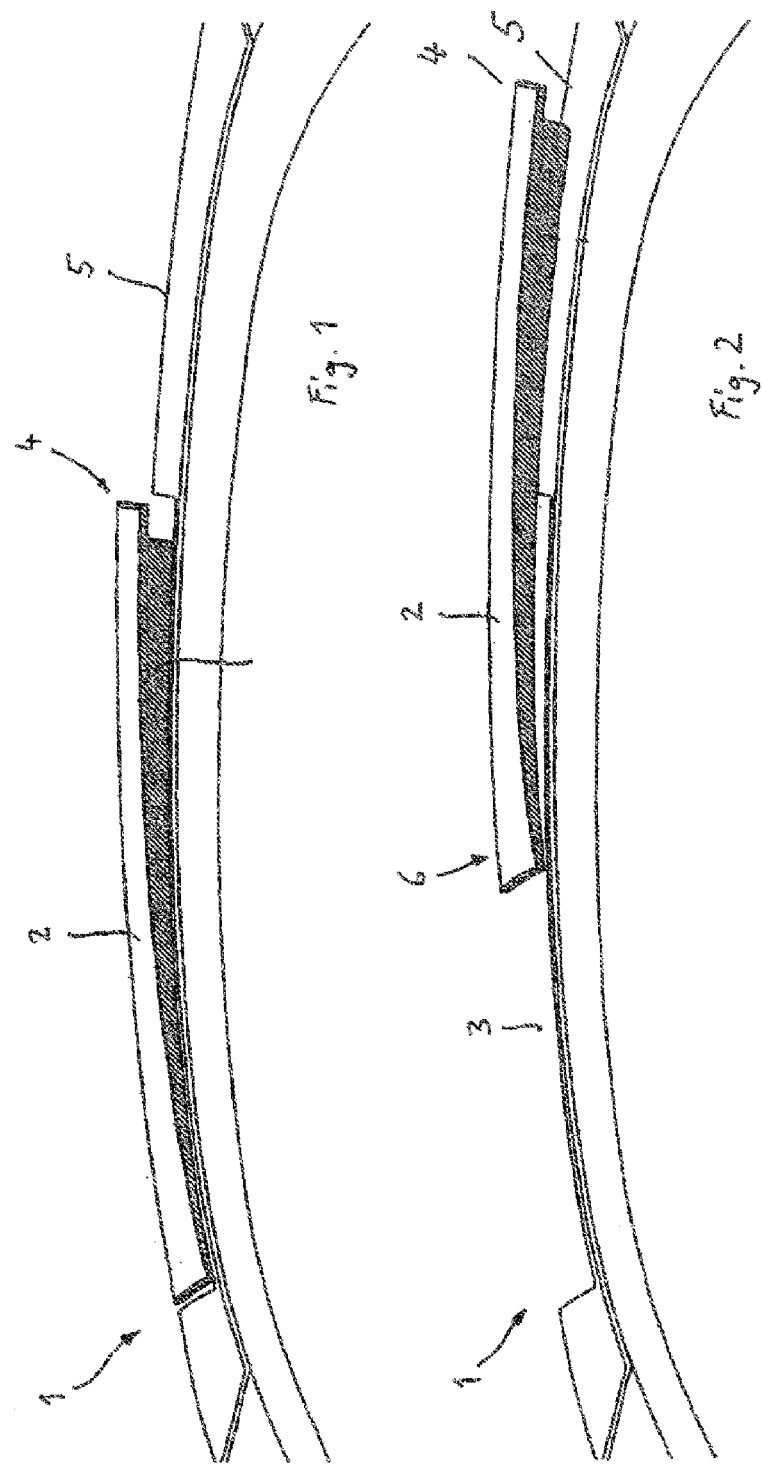

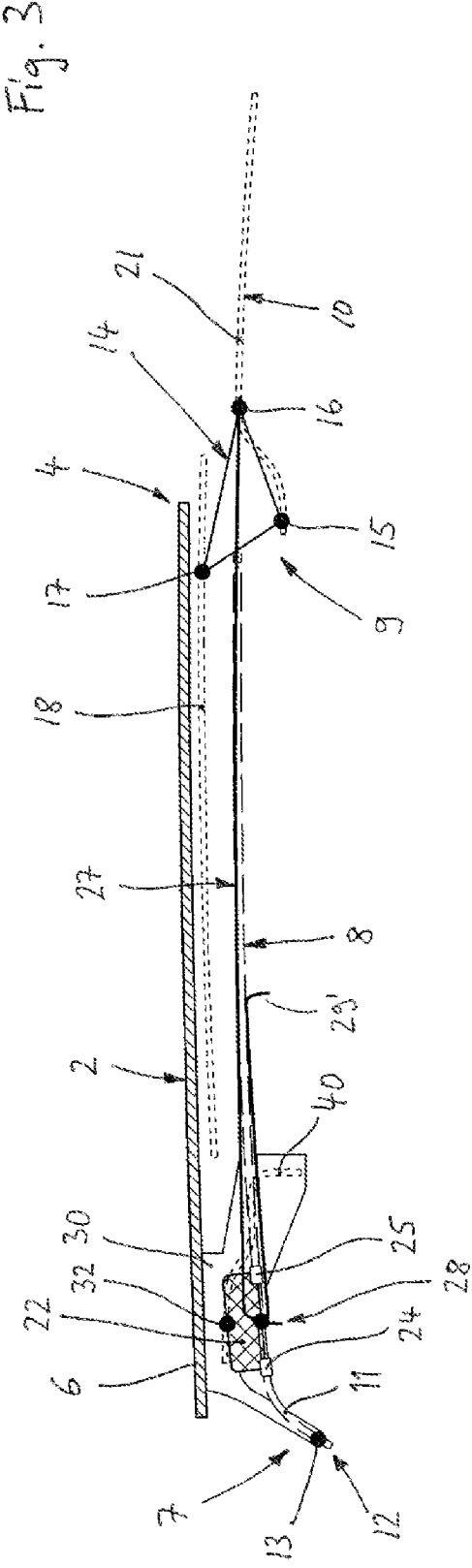
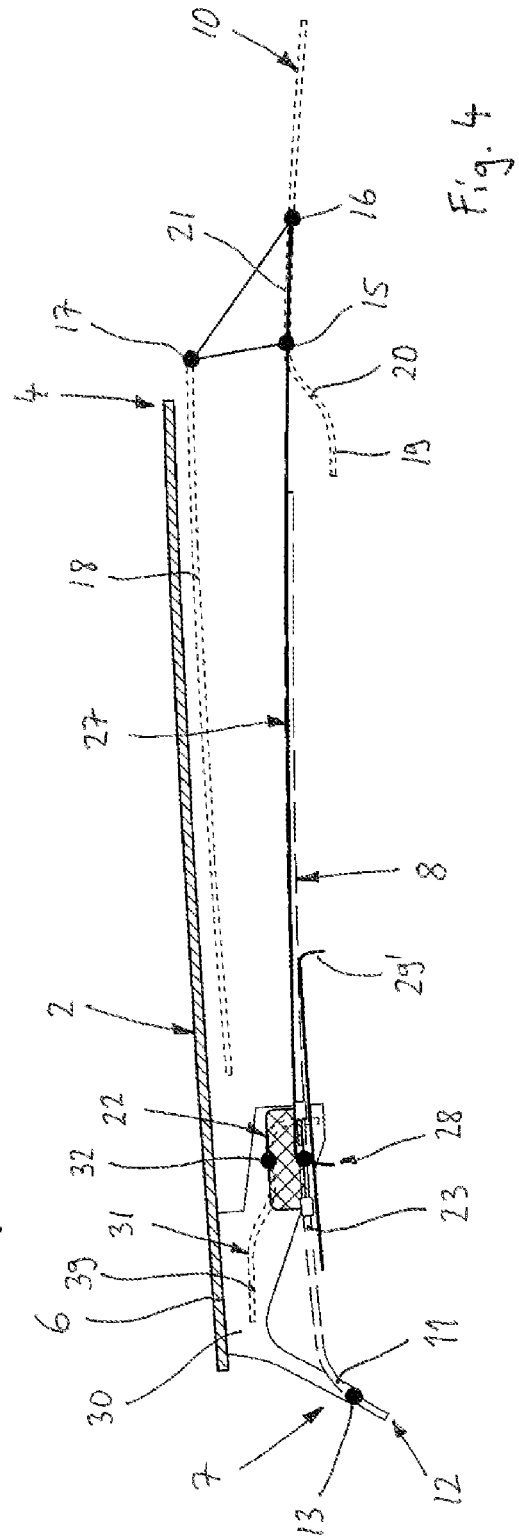

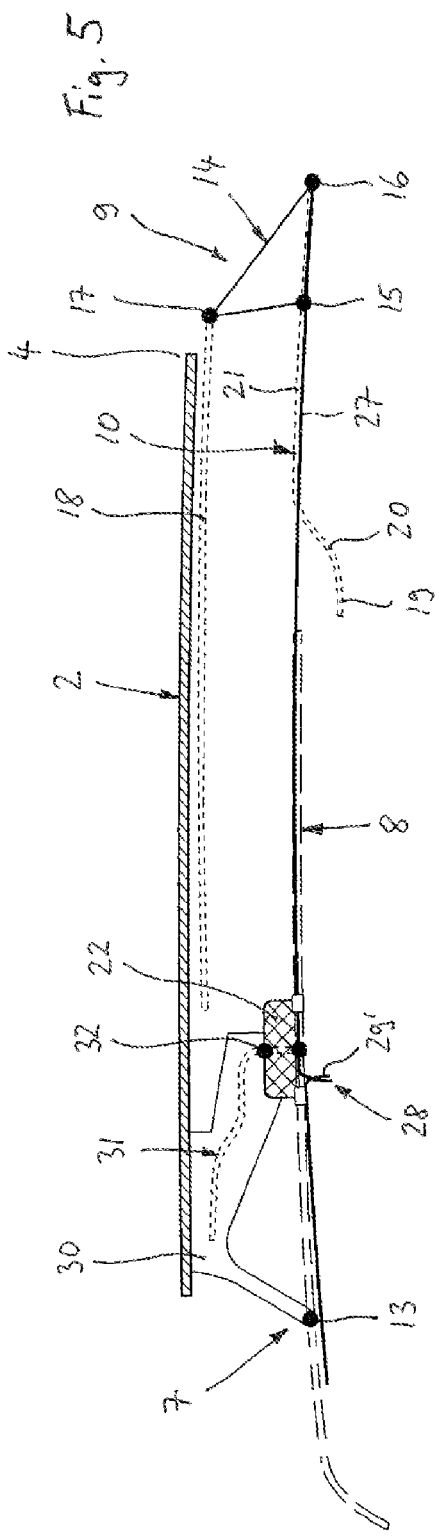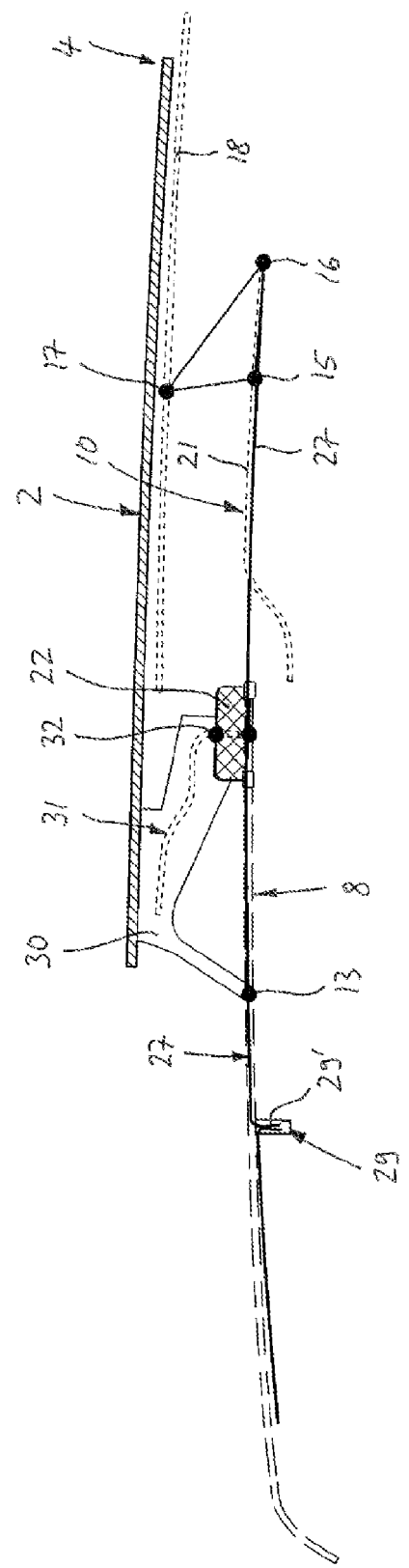

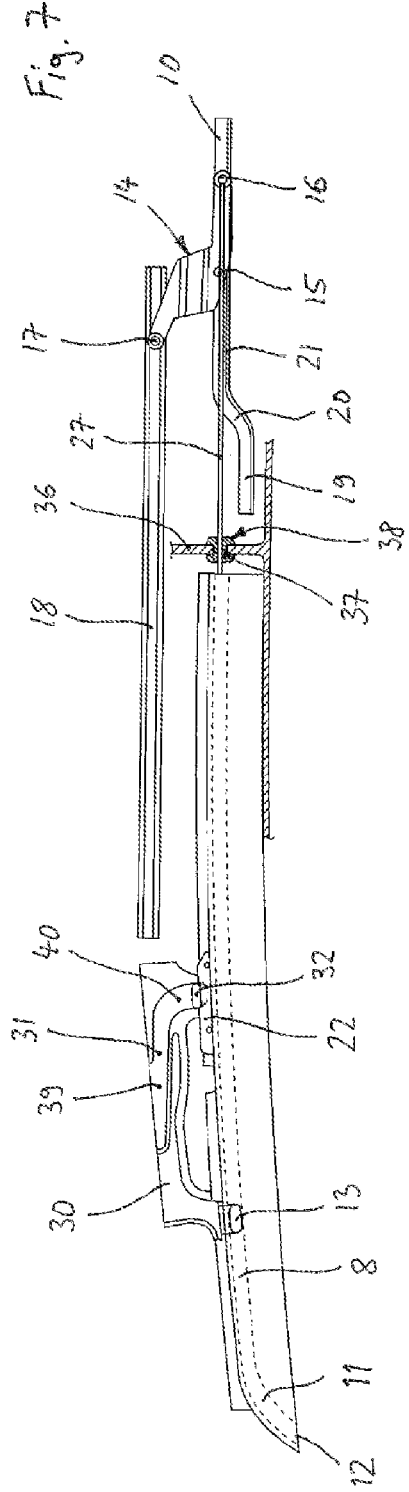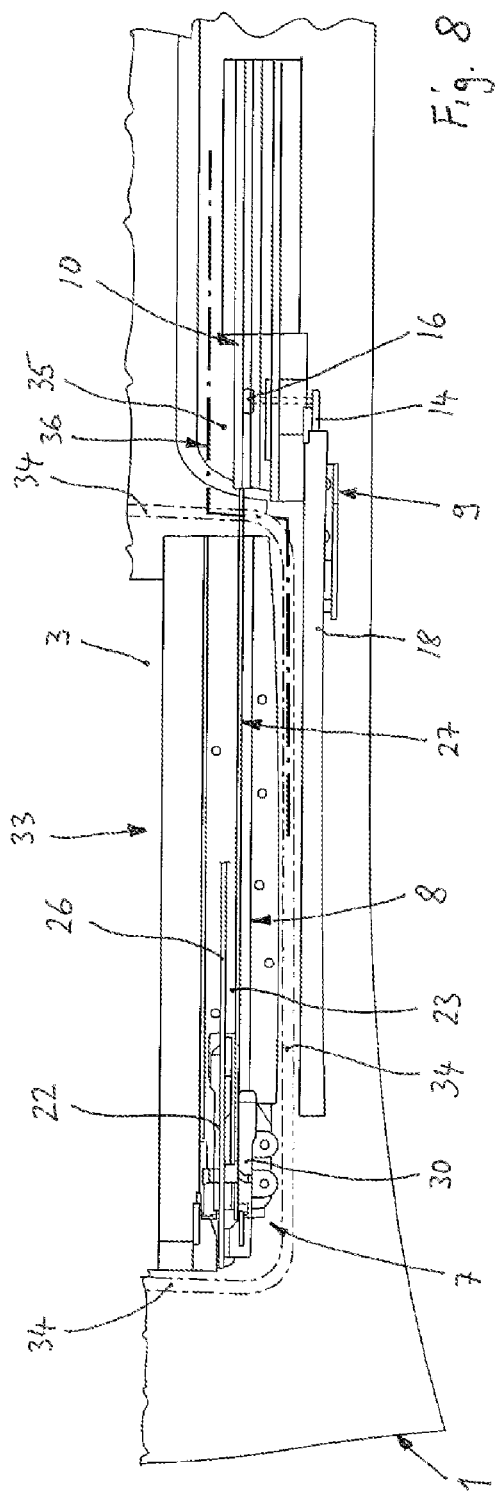

VEHICLE ROOF WHICH CAN BE OPENED AND WHICH COMPRISES A MOVABLE COVER

CROSS-REFERENCE TO RELATED APPLICATIONS

This application is a U.S. national phase application filed under 35 U.S.C. §371 of International Application No. PCT/EP2014/067680, filed Aug. 19, 2014, designating the United States, which claims priority from German Patent Application No. 10 2013 013 587.7, filed Aug. 19, 2013, which are hereby incorporated herein by reference in their entirety for all purposes.

FIELD

The invention relates to a vehicle roof which can be opened, comprising a cover that can be moved between a closed position in a roof opening and an open position in which the cover is raised at least at its rear edge and is at least partly moved over an adjoining roof portion, wherein the cover is supported by means of a front bearing device, which can be moved by a drive device such that the cover can be moved along a front guide rail, and by means of a rear bearing device such that the cover can be raised over the adjoining roof portion and moved along a rear guide rail.

BACKGROUND

From DE 10 2008 046 331 A1 a vehicle roof of this type is known, the cover of which can be moved as a spoiler roof out of a roof opening toward the rear, over the adjoining roof surface. The opening lever of the rear bearing device is securely coupled by means of a reduction gear to the drive of the cover, which takes place over the front bearing device, so that as the cover is being moved into its open position, the distance between the front bearing device and the rear bearing device decreases continuously. Once the cover has been moved to its rear open position, the distance between the front bearing device and the opening lever of the rear bearing device is relatively short. This short supporting length can result in undesirable vibrations in the open cover.

SUMMARY

The object of the invention is to devise a vehicle roof as described in the introductory part which is improved in terms of the stated disadvantage.

This object is achieved with the vehicle roof according to the invention, as described in the introductory part, in that the rear bearing device is coupled to the drive device or the front bearing device over a first or front sub-movement path of the cover and is decoupled from the drive device or the front bearing device over a second or rear sub-movement path of the cover and locked in a stationary manner on the roof side or on the rear guide rail, and in that the drive device moves the cover relative to the rear bearing device, which is held in a stationary manner, on the second or rear sub-movement path.

Advantageous embodiments of the invention are specified in the dependent claims.

In contrast to a fixed coupling between the front and rear bearing devices, in the vehicle roof according to the invention the coupling of the rear bearing device to the drive device or to the front bearing device of the cover, which is driven by the drive device, or to the cover that is driven by the drive device is therefore interrupted at a certain point during the process of opening the cover. The point at which coupling and decoupling take place can be determined based on the desired length of the combined movement and also based on the position of the locked end position of the rear bearing device when the cover is open. Thus over the first movement path, the distance between the front bearing device or the drive device and the rear bearing device remains substantially constant, whereas over the second movement path, once the coupling has been released, the distance between the front bearing device or the drive device and the rear bearing device decreases to the minimal supporting length.

The adjoining roof portion, which in a spoiler roof of this type is usually located behind the roof opening in the longitudinal direction of the vehicle, can be a fixed vehicle roof or a fixed or movable cover, for example.

The guide rails and the bearing devices for the cover are provided on both sides of the vehicle roof, symmetrically to the roof opening and/or to the vehicle longitudinal axis. The specification will describe these guide devices and bearing devices for the most part in reference to only one of the two longitudinal sides of the cover.

In a preferred embodiment, a coupling device for coupling and decoupling the rear bearing device is provided, and the coupling and decoupling are carried out between the coupling device and the drive device or the front bearing device or between the coupling device and the rear bearing device. Suitable as the coupling device or as part of the coupling device is any device that will transmit pulling and pushing forces and movement, e.g. a coupling rod or, e.g. also a correspondingly guided Bowden cable.

The movable drive device is expediently connected via a standard push-pull cable to a drive motor, which can be positioned, e.g., centrally on the vehicle roof, in front of or behind the roof opening. The drive device is directly or indirectly connected to the front bearing device or the cover.

The rear bearing device expediently contains an opening lever, which is movably mounted on a longitudinal guide for the cover. The longitudinal guide for the cover is formed, e.g. as a slotted track guide and is attached to a lateral cover support or cover frame. Only the opening lever connects the rear portion of the cover to the rear guide rail, and thus raises the cover over the roof and supports the cover as it moves along with the cover toward the rear and once it is fixed on the roof side relative to the further moved cover. The opening lever is preferably movably and pivotably mounted on the longitudinal guide for the cover via a slide element. Each component that is movably mounted on the longitudinal guide for the cover is referred to as a slide element, and may also be a sliding carriage or a roller-mounted component, for example.

In the preferred embodiment, it is provided that the opening lever is movably mounted on the rear guide rail at least by means of a front slide element and a rear slide element, which are spaced from one another along the guide rail. When the cover is closed, the opening lever is in a lowered position, in which the rear slide element is located in the horizontal longitudinal guide portion of the guide rail and the front slide element is located in a front, substantially horizontal guide portion, which extends at a lower level than the horizontal longitudinal guide portion. Since the two slide elements are arranged in substantially horizontal portions of the rear guide rail when the cover is closed, the opening lever provides a secure and fixed support for the cover at the rear edge thereof in a vertical or Z-direction, particularly when forces that seek to pull or push the cover upward out of the roof opening are acting on the cover. The vertical distance between the lower level of the front horizontal guide portion and the horizontal longitudinal guide portion of the rear guide rail, and the configuration of the opening lever are coordinated with one another so as to enable the opening lever to carry out the necessary swiveling and lifting movement.

The drive device for moving the cover has, in particular, a drive carriage, which is expediently mounted on or adjacent to the front guide rail so as to be movable parallel thereto. The drive carriage is preferably movably engaged by means of an engaging element in a slotted track guide of a slotted track support, which is connected to the cover and which can be part of the front bearing device of the cover.

The slotted track guide expediently contains a carrying portion, in which the engaging element is located when longitudinal movement is being transmitted to the slotted track support. The carrying portion extends substantially perpendicular to the direction of movement of the drive device or the drive carriage. In a front portion of the slotted track guide, also referred to as the horizontal portion, the engaging element can be moved relative to the slotted track support in the X- or longitudinal direction. Thus the drive carriage can be moved when the cover is substantially stationary in the X- or longitudinal direction, e.g. during movement of the cover to a ventilation position.

In principle, "horizontal" is understood as a direction or movement along the roof or roof-side guides, which may also follow the curvature of the roof in the longitudinal direction.

If, according to a preferred embodiment, the front guide rail in the region of movement of the front bearing device is located in a dry area, in particular inside a cover seal, and the rear guide rail in the region of movement of the rear bearing device is located in a wet area, in particular outside a cover seal, the disposition of the rear guide rail is not limited to the region of the roof opening. Thus the roof portion that is located behind the roof opening can be used without space restrictions for the movement path of the rear bearing device. The wet area is that area of the openable roof which is accessible to water and from which water that enters is channeled off via water channeling devices. The dry area is separated and sealed off from this, and therefore extends particularly within an area that is bounded by a full-perimeter seal on the cover.

The coupling rod is expediently positioned and guided such that it extends through a dividing wall, which can be located between the dry area and the wet area and which has a recess or opening through which the coupling rod extends. In this case, a seal can be used to seal the passage where the coupling rod extends through the recess or opening in the dividing wall. The lateral longitudinal guide for the cover is preferably disposed in the wet area laterally below the side edge region of the cover, outside a cover seal. Thus only the coupling rod needs to be guided through the opening in the dividing wall.

In any case, the rear guide rail can particularly be arranged aligned with the front guide rail, so that the installation space required on the openable vehicle roof is minimized in the transverse direction. However, deviations from this are also possible where special embodiments will be provided.

The coupling and decoupling of the coupling device and the locking of the coupling device on the roof side can be controlled or carried out by means of a locking device. Such a locking device contains, e.g. a locking block device and/or control and contact inclined surfaces or the like.

A cover for closing and at least partially opening up the roof opening is understood as any roof element that can perform this function, regardless of its form or configuration. Such a roof element is, for example, a transparent glass cover or plastic cover, onto which frame and bearing elements can be attached or formed.

BRIEF DESCRIPTIONS OF THE DRAWINGS

In the following, the invention will be specified in greater detail in the context of an embodiment example of a vehicle roof according to the invention, with reference to the set of drawings. The drawings show:

FIG. 1 a schematic side view illustration of a vehicle roof which can be opened, comprising a cover which is situated in a roof opening in a ventilation position, in which the rear edge is raised;

FIG. 2 a side view of the vehicle roof according to FIG. 1, with the cover in an open position, moved toward the rear over the vehicle roof;

FIG. 3 a schematic side view illustration of the vehicle roof with the cover closed;

FIG. 4 a schematic side view illustration of the vehicle roof with the cover raised out of the roof opening to a ventilation position;

FIG. 5 a schematic side view illustration of the vehicle roof with the cover in the raised position, moved toward the rear over the adjoining roof;

FIG. 6 a schematic side view illustration of the vehicle roof with the cover moved to a rear open position;

FIG. 7 a schematic side view illustration of the cover bearing in a position according to FIG. 5; and FIG. 8 a schematic plan view illustration of the left cover bearing with a roof frame, when the cover is closed.

DETAILED DESCRIPTION

An openable vehicle roof 1 of a vehicle, e.g. an automobile, comprises a cover 2, which can be raised from a closed position in a roof opening 3 (see FIG. 1) and moved to a ventilation position, and can be moved from the ventilation position, in which rear edge 4 is raised, over an adjoining roof portion 5 behind roof opening 3 in the vehicle or roof longitudinal direction, to an open position (see FIG. 2). A roof of this type is also called a spoiler roof. Rear roof portion 5 may be formed, in principle, by a fixed roof or by a movable roof portion. The axial and directional terms used in the description such as, e.g. "front" and "rear", "above" and "below", "outer" and "inner", "horizontal" and "vertical" and "lateral" refer to a three-dimensional system of coordinates of the vehicle.

Cover 2 is mounted so as to be movable and displaceable on both sides of roof opening 3 along a lateral longitudinal guide, located on the roof side, e.g. a front guide rail 8, in each case by means of a front bearing device 7 arranged below the front region 6 of the cover, and so as to be movable and displaceable along a lateral longitudinal guide, e.g. rear guide rail 10, disposed on the roof side, by means of a rear bearing device 9, assigned to the rear edge 4 of the cover.

Front guide rail 8 has a starting portion 11, the profile of which slopes upward at an angle proceeding from front end 12. When cover 2 is closed (see FIG. 3), a slide element 13 of front bearing device 7 is located in starting portion 11 in a lowered position, near front end 12 of guide rail 8.

Rear bearing device 9 has an opening lever 14 (in FIGS. 3 to 6, opening lever 14 is depicted schematically in the form of a triangle), which on one side is movably mounted by means of a front slide element 15 and a rear slide element 16 on rear guide rail 10, and on the other side is mounted so as to slide along a cover guide 18 by means of an upper slide element 17 and so as to pivot in relation to cover guide 18. Rear guide rail 10 has at its front end a front horizontal guide rail portion 19 at a lower level, to which an approximately S-shaped ascending intermediate portion 20 is attached, which extends up to the upper level of a longitudinally extending main guide portion 21 of rear guide rail 10.

A drive carriage 22 is movably mounted, e.g. via two slide elements 24 and 25, on a lateral longitudinal guide track 23, which extends longitudinally on front guide rail 8, and said drive carriage is connected via a drive cable 26 (see FIG. 8) to a drive motor, which is located e.g. on the vehicle roof centrally behind roof opening 3.

A coupling rod 27 is fixedly connected to opening lever 14 and particularly to rear slide element 16 of opening lever 14, and extends therefrom along front guide rail 8 toward the front, up to drive carriage 22, which is in a forward end position when cover 2 is closed. Coupling rod 27 can be coupled particularly by means of a locking device 28 to drive carriage 22, to allow said coupling rod to be displaced by the driving movement of said drive carriage, and can be decoupled from drive carriage 22 and secured on the roof side, e.g. at a recess 29 (shown only in FIG. 6) in front guide rail 8 or at a locking hook 29' or the like, allowing drive carriage 22 to be moved relative to idle coupling rod 27 and relative to likewise idle opening lever 14.

Front bearing device 7 has a slotted track support 30, which is attached to the underside of the cover and particularly to a cover support and contains a slotted track guide 31, in which an engaging element 32 of drive carriage 22 is guided.

Front guide rail 8 is preferably located in a dry area 33 of vehicle roof 1 (see FIG. 8), which extends within a cover seal 34 which seals cover 2 around its entire perimeter in relation to the roof, and which is attached to cover 2 or to the roof. Front bearing device 7 with its slide element 13 and drive carriage 22 move within this dry area 33. Rear guide rail 10 is located in a wet area 35, which is separated from dry area 33, and the movement path of opening lever 14 of rear bearing device 9 and also cover guide 18 for opening lever 14 extend therein. A dividing wall 36 separates dry area 33 from wet area 35, and a portion of dividing wall 36, indicated schematically in FIG. 8 as a dotted-dashed line, extends particularly in the transverse direction between front guide rail 8 and rear guide rail 10. Dividing wall 36 has a recess or opening 37, through which coupling rod 27 extends. A seal 38 seals coupling rod 27 in recess or opening 37 relative to partition wall 36.

In the following, the process of opening cover 2 from its closed position (FIG. 3) to its fully open position (FIG. 6) will be described. In the closed position, cover 2 is disposed in roof opening 3 flush with the surrounding roof area 5. In this position, front slide element 13 is in a lowered position at front end 12 of front guide rail 8, and engaging element 32 of drive carriage 22 is located in a front horizontal portion 39 of slotted track guide 31 (see FIGS. 3 and 7), which extends nearly horizontally and angled slightly downward toward the rear. Cover 2 is therefore supported vertically at its front region 6 substantially via front horizontal portion 39 of slotted track guide 31, which is supported substantially vertically on engaging element 32 of drive carriage 22.

Opening lever 14 supports cover 2 laterally in the region of rear edge 4 of the cover. Since front slide element 15 is located in front horizontal guide rail portion 19 and rear slide element 16 is located in rear horizontal main guide portion 21 of guide rail 10, cover 2 is securely supported and locked at its rear edge 4 in the vertical or Z-direction. Opening lever 14 is securely coupled via coupling rod 27 to drive carriage 22, which is in turn held in place by the drive motor. Thus opening lever 14 cannot move when forces arising, e.g. from negative pressure caused by air flow or vibrations are acting on cover 2.

To move cover 2 from its closed position to a ventilation position (movement from the position of FIG. 3 to the position of FIG. 4), drive carriage 22 is moved toward the rear along its longitudinal guide track 23. At the same time, opening lever 14, which is coupled via coupling rod 27 to drive carriage 22, is moved toward the rear on its rear slide element 16, while its front slide element 15 likewise moves from lower guide rail portion 19 through intermediate portion 20 to upper main guide portion 21, with this movement causing opening lever 14 to pivot upward to its upright supporting position. As opening lever 14 pivots, upper slide element 17 raises cover 2 at its rear edge 4 by virtue of the engagement of said slide element on cover guide 18.

At front region 6 of cover 2, engaging element 32 of drive carriage 22 moves in front horizontal portion 39 of slotted track guide 31, which extends along the movement path of engaging element 32 toward longitudinal guide track 23 of drive carriage 22, e.g. continuously or also in a curved path. As a result, slotted track support 30 is raised slightly, and slide element 13, which as a result is moved within starting portion 11 of front guide rail 8, also determines the position in the X- or longitudinal direction of cover 2, which is thereby moved slightly toward the rear. Thus at its front region 6, cover 2 follows the movement of slide element 13 in front guide rail 8, while at rear end 4 of the cover, upper slide element 17 of opening lever 14 moves toward the rear on cover guide 18 relative to cover 2.

To move cover 2 from the ventilation position shown in FIG. 4 further toward the rear over the adjoining roof portion 5 into an open position, drive carriage 22 is moved further toward the rear along longitudinal guide track 23. Engaging element 32 at first continues to slide within horizontal portion 39 of slotted track guide 31, which extends substantially parallel to longitudinal guide track 23, since slide element 13, which is located in the ascending starting portion 11 of front guide rail 8, still does not effect any substantial X- or longitudinal movement of cover 2 and therefore holds slotted track support 30 largely stationary in the X- or longitudinal direction. The profile of horizontal portion 39 can descend somewhat more severely, for example, or can have an S-shaped profile for interacting with slide element 13 that moves along the profile of front guide rail 8.

When engaging element 32 enters an adjoining rear carrying portion 40 of slotted track guide 31, which extends substantially vertically downward, slide element 13 reaches the upper, horizontally extending level of front guide rail 8. Engaging element 32, which is moved by drive carriage 22, carries slotted track support 30 and thus also cover 2 along front guide rail 8. At the same time, opening lever 14 is moved along via coupled coupling rod 27.

In the position shown in FIG. 5, coupling rod 27 is decoupled from drive carriage 22 by means of locking device 28, and is locked on the roof side, e.g. in recess 29 of guide rail 8 or at locking hook 29'. Opening lever 14 is thereby held in place on rear guide rail 10. When drive carriage 22 is moved further toward the rear along its longitudinal guide track 23, it carries slotted track support 30 and therefore cover 2 along with it toward the rear via its engaging element 32. Cover 2 is thus guided at the front via slide element 13 on front guide rails 8 and at the rear via upper slide element 17 of opening lever 14, wherein cover 2 with its cover guide 18 moves toward the rear relative to upper slide element 17, while opening lever 14 remains stationary. A fully opened position is shown in FIG. 6.

To close cover 2, the described movements are carried out in reverse sequence.

The position at which coupling rod 27 is secured on the roof or on front guide rail 8, or the position of recess 29 for coupling/decoupling and locking coupling rod 27 and also the length of coupling rod 27 and therefore the position of opening lever 14 when it is blocked in the longitudinal direction can be selected and determined factoring in and based on the available movement path and the provided support length between front bearing device 7 and rear bearing device 9. When front guide rail 8 is in dry area 33 and rear guide rail 10 is in wet area 35, the length of roof opening 3 does not restrict the movement path of rear bearing device 9 or of opening lever 14. Rather, opening lever 14 can be movably mounted in the region of roof portion 5 that extends behind roof opening 3, and despite dividing wall 36, can be connected and/or coupled to front bearing device 7 and/or to drive carriage 22, which likewise moves only in dry area 33.

Front guide rail 8 and rear guide rail 10 can each be attached separately to the roof structure or to roof side beams of the vehicle roof, or they can be parts of a frame assembly, which supports cover 2 and is attached to vehicle roof 1. The drive motor for moving cover 2 is attached, e.g. to a front or a rear transverse section of the frame assembly.

The individual features disclosed in the description and based on the embodiment example may be combined in any technically expedient arrangement and configuration with the subject matter of the invention in its general form.

The invention claimed is:

1. A vehicle roof which can be opened, comprising:
a cover that can be moved between a closed position in a roof opening and an open position in which the cover is raised at least at its rear edge and is at least partly moved over an adjoining roof portion,
wherein the cover is supported by means of a front bearing device, which can be moved by a drive device, such that the cover can be moved along a front guide rail, and is supported by means of a rear bearing device such that the cover can be raised over the adjoining roof portion and moved along a rear guide rail,
wherein the rear bearing device is coupled to the drive device over a first or front sub-movement path of the cover and is decoupled from the drive device over a second or rear sub-movement path of the cover,
wherein the drive device moves the cover relative to the rear bearing device, which is held in a stationary manner, on the second or rear sub-movement path, and an opening lever of the rear bearing device is movably mounted on a longitudinal guide of the cover, and
wherein the opening lever is mounted on the rear guide rail so as to be movable at least by means of a front slide element and a rear slide element, and in that when the cover is closed, the rear slide element is located in a horizontal main guide portion of the rear guide rail and the front slide element is located in a front horizontal guide portion of the rear guide rail, which extends at a lower level than the main guide portion.

2. The vehicle roof according to claim 1, wherein a coupling device for coupling and decoupling the rear bearing device is provided, and the coupling and decoupling are carried out between the coupling device and the drive device.

3. The vehicle roof according to claim 2, wherein the coupling device has a coupling rod for coupling the rear slide element of the opening lever to the drive device.

4. The vehicle roof according to claim 1, wherein the drive device has a drive carriage, which is engaged by means of an engaging element in a slotted track guide of a slotted track support which is connected to the cover.

5. The vehicle roof according to claim 4, wherein the slotted track guide has a carrying portion, in which the engaging element is located during transmission of a longitudinal movement to the slotted track support.

6. The vehicle roof according to claim 1, wherein the front guide rail in the area of movement of the front bearing device is located in a dry area and the rear guide rail in the area of movement of the rear bearing device is located in a wet area.

7. The vehicle roof according to claim 6, wherein a dividing wall separates the dry area from the wet area and has a recess or opening, through which the coupling device or the coupling rod extends.

8. The vehicle roof according to claim 7, wherein a seal seals the passage where the coupling rod extends through the recess or opening in the dividing wall.

9. The vehicle roof according to claim 1, wherein the cover longitudinal guide is disposed laterally below the side edge region of the cover, outside a cover seal.

10. The vehicle roof according to claim 1, wherein the rear guide rail is arranged aligned with the front guide rail.

11. The vehicle roof according to claim 1, wherein a locking device is provided for coupling and decoupling the coupling device and for locking the coupling device.

* * * * *